(12) United States Patent
Takane

(10) Patent No.: US 7,573,504 B2
(45) Date of Patent: Aug. 11, 2009

(54) IMAGE RECORDING APPARATUS, IMAGE RECORDING METHOD, AND IMAGE COMPRESSING APPARATUS PROCESSING MOVING OR STILL IMAGES

(75) Inventor: Yasuo Takane, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 779 days.

(21) Appl. No.: 10/917,367

(22) Filed: Aug. 13, 2004

(65) Prior Publication Data

US 2005/0046707 A1 Mar. 3, 2005

(30) Foreign Application Priority Data

Sep. 2, 2003 (JP) ............... 2003-309710

(51) Int. Cl.
*H04N 5/225* (2006.01)

(52) U.S. Cl. .................................. 348/220.1; 386/121

(58) Field of Classification Search ............. 348/220.1, 348/559, 526, 14.14; 386/121
See application file for complete search history.

(56) References Cited

U.S. PATENT DOCUMENTS

| | | | |
|---|---|---|---|
| 2003/0095191 A1* | 5/2003 | Saito .................. | 348/220.1 |
| 2004/0051793 A1* | 3/2004 | Tecu et al. ............ | 348/231.99 |
| 2004/0100654 A1* | 5/2004 | Kodama et al. .......... | 358/1.15 |
| 2004/0218059 A1* | 11/2004 | Obrador et al. .......... | 348/220.1 |

FOREIGN PATENT DOCUMENTS

| | | |
|---|---|---|
| JP | 10-108133 A | 4/1998 |
| JP | 11-234624 A | 8/1999 |
| JP | 2000-184330 A | 6/2000 |
| JP | 2003-18532 A | 1/2003 |
| JP | 2003-158653 A | 5/2003 |

OTHER PUBLICATIONS

Machine English Translation of JP 11-234624 A (JP publication on Aug. 27, 1999).*

* cited by examiner

*Primary Examiner*—Lin Ye
*Assistant Examiner*—Nelson D Hernández Hernández
(74) *Attorney, Agent, or Firm*—Birch, Stewart, Kolasch & Birch, LLP

(57) ABSTRACT

The present invention relates to an image recording apparatus, an image recording method, and an image compressing apparatus capable of performing a still image process during moving image shooting without stopping a sequence of a moving image process also in the case of performing the still image shooting during the moving image shooting. In a moving image shooting mode, CCD data of an odd-numbered frame image and image data of an even-numbered frame image are separately stored into an SDRAM. In the case of writing CCD data of an odd-numbered frame image, in parallel with the writing, a moving image process based on CCD data of an even-numbered frame image written in the immediately preceding cycle is performed. When shooting still images is directed during the moving image, the still image process is divided into processes for a plurality of cycles and then executed.

7 Claims, 7 Drawing Sheets

IMAGE RECORDING APPARATUS, IMAGE RECORDING METHOD, AND IMAGE COMPRESSING APPARATUS PROCESSING MOVING OR STILL IMAGES

CROSS-REFERENCE TO RELATED APPLICATION

This application claims priority under 35USC 119 from Japanese Patent Application No. 2003-309710, the disclosure of which is incorporated by reference herein.

BACKGROUND OF THE INVENTION

1. Field of the Invention

The present invention relates to an image recording apparatus, an image recording method, and an image compressing apparatus, and more particularly, to an image recording apparatus, an image recording method, and an image compressing apparatus capable of compressing a image shot by a shooting component as a moving image or a still image and recording the compressed image.

2. Description of the Related Art

Hitherto, a digital camera capable of shooting not only a still image but also a moving image is known. In such a digital camera, a still image or a moving image is compressed by a predetermined compressing method (coding method) and recorded on a recording medium such as a memory card.

For example, the JPEG (Joint Photographic coding Experts Group) is widely used as a still image compressing method, and the MPEG (Moving Image coding Experts Group) and the motion JPEG are widely used as a moving image compressing method.

Such digital cameras include a digital camera capable of recording a still image onto a recording medium by performing a predetermined operation during shooting of a moving image and a digital camera capable of reproducing a still image by performing a predetermined operation during reproduction of a moving image (refer to, for example, Japanese Patent Application Laid-Open (JP-A) Nos. 11-234624 and 2000-184330).

Some conventional general digital cameras, however, have only one processing system including a compression circuit for compressing an image and a memory for storing image data in consideration of cost. In such digital cameras, in the case of changing the size of an image or the compression ratio during shooting of a moving image and recording a still image onto a recording medium, a problem occurs such that the sequence of a moving image compressing process has to be stopped once and then a process of compressing a still image has to be performed.

SUMMARY OF THE INVENTION

The present invention has been achieved in consideration of the above described fact and its object is to provide an image recording apparatus, an image recording method, and an image compressing apparatus capable of performing a process on a still image during shooting of a moving image without stopping a sequence of a moving image process even in the case of performing still image shooting during moving image shooting.

To achieve the object, a first aspect of the invention is to provide an image recording apparatus including: a shooting component for shooting an image of a subject; a first storing component for storing shot frame image data; a moving image compressing component for performing a compressing process for a moving image on the frame image data, thereby generating moving image data; and a moving image data recording component for recording the moving image data onto a recording medium, and can perform still image shooting during moving image shooting of executing a moving image process of the frame image every predetermined period. The image recording apparatus further includes: a second storing component for storing the frame image data in the case where the still image shooting is directed during the moving image shooting; a still image compressing component for performing a compressing process for a still image on the frame image data stored in the second storing component, thereby generating still image data; a control component, when the compressing process for the still image is not finished within the predetermined period, for controlling the still image compressing component so as to divide the compressing process for the still image into processes for a plurality of predetermined periods and executes the divided compressing processes for still image; and a still image data recording component for recording the still image data onto a recording medium.

According to the invention, at the time of the moving image shooting, frame image data shot by the shooting component is temporarily stored in the first storing component. The frame image data is subjected to the compressing process for moving image by the moving image compressing component and the compressed data is recorded as moving image data onto a recording medium. At the time of the moving image shooting, such a process is executed every predetermined time period and one moving image file is constructed by a plurality of pieces of moving image data. The image recording apparatus can perform the still image shooting by being given a direction for still image shooting by, for example, an operation of the operator during the moving image shooting.

The image recording apparatus has the second storing component for storing frame image data in the case where the still image shooting is directed during the moving image shooting. Specifically, the image recording apparatus has, in addition to the first storing component for storing frame image data for moving image, a second storing component only for storing frame image data for a still image in the case where the still image shooting is directed during the moving image shooting.

The still image compressing component performs the compressing process for a still image on the frame image data stored in the second storing component, thereby generating still image data. The data size of a still image is usually larger than that of one frame of a moving image and there is a case that the compressing process for a still image is not finished within a predetermined period, specifically, within the time period of performing the moving image process on one frame image.

Consequently, when the compressing process for a still image is not finished within the predetermined period, the control component controls the still image compressing component so as to divide the compressing process for the still image into processes for a plurality of predetermined periods and executes the divided compressing processes for the still image. Since the frame image data for the still image is stored in the dedicated second storing component at this time, a process can be performed by using the frame image data stored in the first storing component in the moving image process and a process can be performed by using the frame image data stored in the second storing component in the still image process.

Therefore, even in the case where the still image shooting is directed during the moving image shooting, without stopping the moving image process, the still image process can be performed. In this manner, the still image data subjected to the still image process is recorded onto a recording medium by the still image data recording component.

The moving image compressing component may also serve as the still image compressing component and the still image data may be generated in a period other than the period of performing the process of generating the moving image data. In this case, the still image process is performed every predetermined time period and one moving image file is constructed by a plurality of still images. As described above, the moving image compressing component also serves as the still image compressing component, thereby enabling the apparatus to be constructed cheaply.

When the still image shooting is directed during the moving image shooting, the control component may copy frame image data stored in the first storing component to the second storing component.

A second aspect of the invention is to provide an image compressing apparatus including: a compressing process component for performing a compressing process on input frame image data; a first buffer for storing compression data for moving image subjected to the compressing process; and a second buffer for storing compression data for a still image subjected to the compressing process.

According to the invention, compressed data for moving image and compressed data for still image are provided separately, so that a single image compressing circuit can perform both the compressing process for a moving image and the compressing process for a still image. Even in the case where the still image shooting is performed in the moving image shooting, without stopping the moving image process, the still image process can be performed.

A third aspect of the invention is to provide an image recording method in an image recording apparatus capable of performing still image shooting during moving image shooting of executing a moving image process on a frame image every predetermined period, the image recording method comprising the steps of: shooting an image of a subject; storing shot frame image data into a first storing component; performing a compressing process for moving image on the frame image data, thereby generating moving image data; recording the moving image data onto a recording medium; in the case where the still image shooting is directed during the moving image shooting, storing the frame image data into a second storing component; performing a compressing process for a still image on the frame image data stored in the second storing component, thereby generating still image data; and recording the still image data onto a recording medium, wherein when the compressing process for a still image is not finished within the predetermined period, the compressing process for a still image is divided into processes for a plurality of predetermined periods and executed.

As described above, the invention produces an excellent effect such that, even in the case of performing the still image shooting during the moving image shooting, without stopping the sequence of the moving image process, the still image process can be performed during the moving image shooting.

DETAILED DESCRIPTION OF THE INVENTION

FIRST EMBODIMENT

An embodiment of the present invention will be described hereinbelow with reference to the drawings. Although the case of applying the invention to a digital still camera will be described in the embodiment, the invention can be also applied to a digital video camera and a portable terminal device having an image shooting function such as a cell phone with built-in camera.

Figure 1:
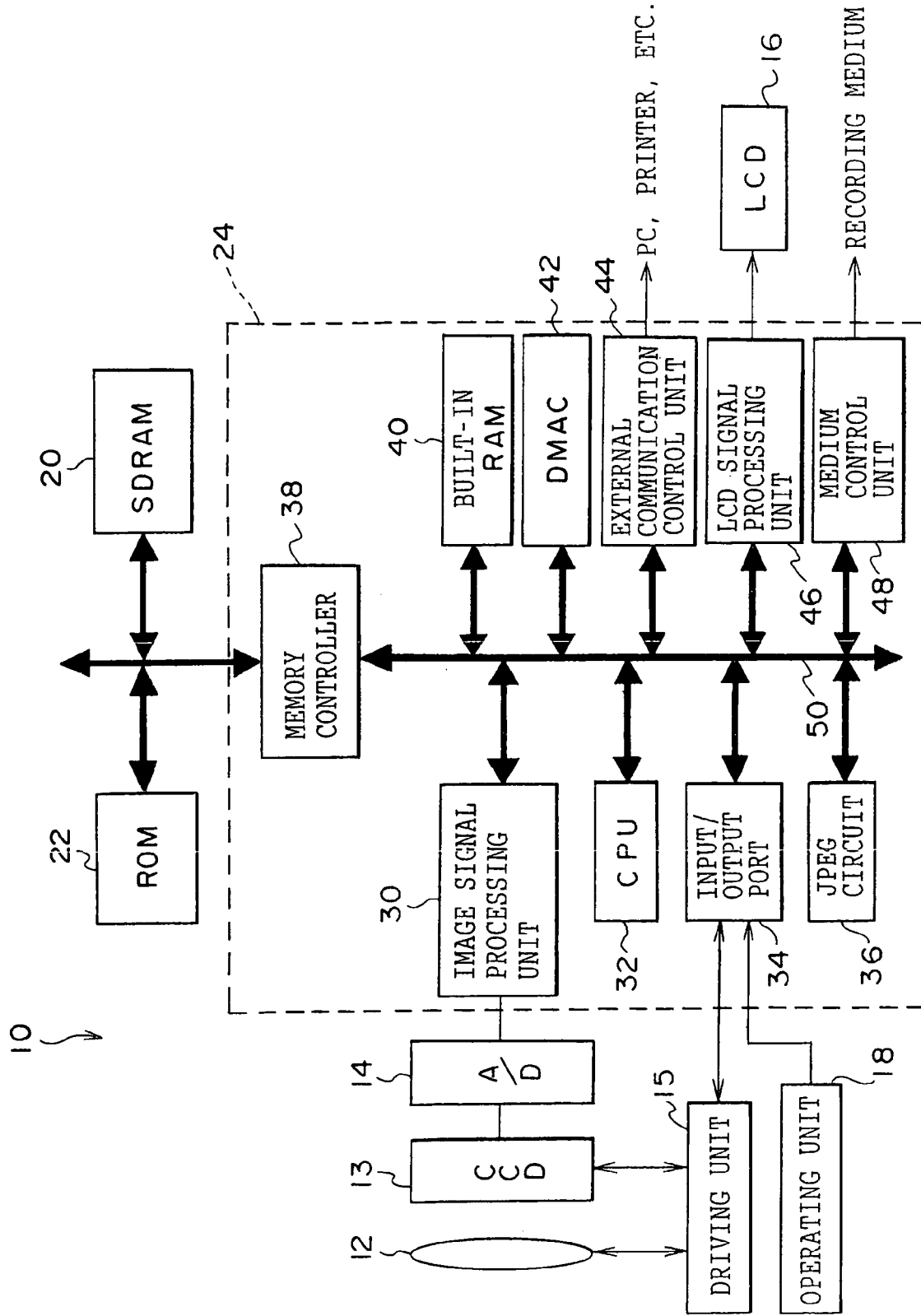
FIG. 1 is a block diagram of a digital camera according to a first embodiment of the present invention.

As shown in FIG. 1, a digital still camera (hereinbelow, called a digital camera) 10 according to the embodiment comprising: an optical unit 12 including a lens for forming an image of a subject; a CCD (Charge Coupled Device) 13 disposed rearward of the optical unit 12 in the optical axis direction; an A/D converter 14 for converting an analog image signal output from the CCD 13 into a digital signal; a driving unit 15 including a lens driving unit for driving the lens in the optical unit 12 and a CCD driving unit for driving the CCD 13; an LCD 16 for displaying an image obtained by photographing with the digital camera 10 and various information; an operating unit 18 operated by the user; an SDRAM (Synchronous Dynamic Random Access Memory) 20 as a main memory device for temporarily storing digital image data obtained mainly by image shooting with the CCD 13; an external ROM 22 in which various programs, parameters and the like are pre-stored; and a main control unit 24 for controlling the whole operations of the digital camera 10. The SDRAM 20 functions as a main memory.

The operating unit 18 includes a shutter button operated to direct execution of shooting of a still image or a moving image, a mode changing switch as an image shooting mode selecting component operated to select any of a still image shooting mode, a moving image shooting mode and a reproduction mode, a cursor button operated to set various parameters and, when the reproduction mode is selected, to designate an image to be reproduced, and a power switch operated to turn on/off the digital camera 10.

In the main control unit 24, an image signal processing unit 30 for performing various processes on a digital signal input from the A/D converter 14; a CPU 32 for controlling whole operations of the digital camera 10 in accordance with an operating state of the operating unit 18 by the user; an input/output port 34 for performing an input/output control on the driving unit 15, the operating unit 18 and the like; a JPEG circuit 36 for compressing/decompressing image data in accordance with JPEG format and encoding the data; a memory controller 38 for controlling reading/writing of data from/to the SDRAM 20 and reading of data from the ROM 22; a builtin RAM 40 of relatively small capacity; a DMA controller (DMAC) 42 for performing DMA (Direct Memory Access) transfer; an external communication control unit 44 for transmitting/receiving various data to/from external devices such as a personal computer and a printer each connected to the digital camera 10 via a predetermined cable such as a USB cable; an LCD signal processing unit 46 for displaying an image on the LCD 16; and a medium control unit 48 for controlling reading/writing of various data from/to a recording medium are connected to each other via a bus 50.

In the embodiment, the main control unit 24 takes the form of a 1-chip LSI (Large Scale Integrated circuit), thereby realizing smaller size, higher reliability and lower cost of the digital camera 10.

The optical unit 12 has a zoom lens group, a focus lens, and a lens moving mechanism for moving each of the lenses in the optical axis direction and is constructed as a zoom lens capable of changing the focal length (variable power).

In the optical unit 12, by the control of the driving unit 15, the zoom lens group is moved in the optical axis direction (focal length variable lens) so that desired zoom magnification is set, and the focus lens is moved in the optical axis direction so that incident light indicative of an image of the subject passed through the lens forms an image on the photosensitive surface of the CCD 13 (autofocus (AF) mechanism). In such a manner, the CCD 13 captures the image of the subject on the basis of the incident light indicative of the image of the subject passed through the lens in the optical unit 12 and outputs an analog image signal indicative of the image of the subject.

In the embodiment, a so-called TTL (Through the Lens) system of adjusting the lens position so that the contrast of an image shot by the shooting operation becomes the maximum is employed as a focus control. A focus control is automatically performed so that focus is achieved on a subject existing in a predetermined position in a shooting area (AF frame). Specifically, in the case where the still image shooting mode for shooting a still image is selected by the operation of the mode changing switch in the operating unit 18 by the user, when the shutter button is touched, the focus control is performed automatically. On the other hand, in the case where the moving image shooting mode for shooting a moving image is selected, after the shutter button is depressed to start the shooting operation, the focus control is executed continuously.

An output terminal of the CCD 13 is connected to the A/D converter 14. The A/D converter 14 converts an analog image signal indicative of the image of the subject shot and output by the CCD 13 into digital image data (hereinbelow, called "CCD data"). An output terminal of the A/D converter 14 is connected to the image signal processing unit 30 and the CCD data is temporarily stored into the SDRAM 20 via the memory controller 38 by the DMA transfer.

The image signal processing unit 30 reads the CCD data temporarily stored in the SDRAM 20 by the DMA transfer and performs a resizing process as necessary. For example, by applying a digital gain according to the kind of a light source, white balance is adjusted, and various image processes such as a gamma process and a sharpness process are performed. By performing a YC converting process on the image data subjected to the image processes, luminance data Y and chroma data Cr and Cb (hereinbelow, called "YC data") are generated from the digital image data of R, G and B. The YC data is temporarily stored into the SDRAM 20 via the memory controller 38.

The YC data stored in the SDRAM 20 is read by the DMA transfer by the image signal processing unit 30 via the memory controller 38 and is input to the JPEG circuit 36. The JPEG circuit 36 compresses and encrypts the input YC data by the JPEG system as an international standard of color still image encoding. The data compressed by the JPEG circuit 36 is DMA transferred and temporarily stored into the SDRAM 20 via the medium control unit 48 and recorded onto a recording medium inserted in the digital camera 10.

The recording medium can take various forms such as Smart Media, PC card, microdrive, multimedia card (MMC), magnetic disk, optical disk, magnetooptic disk and memory stick, and a signal processing component and an interface adapted to a medium used are employed.

The YC data stored in the SDRAM 20 is read by the image signal processing unit 30 via the memory controller 38 and is input to the LCD signal processing unit 46.

The LCD signal processing unit 46 has a video encoder and converts the input YC data into an NTSC (National TV Standards Committee) signal. The LCD signal processing unit 46 is connected to the LCD 16 and supplies the converted NTSC signal to the LCD 16, thereby displaying an image on the LCD 16.

The YC data based on the image signal output from the CCD 13 is periodically rewritten and a video signal generated from the YC data is supplied to the LCD 16. In such a manner, the image of the subject shot by the CCD 13 is displayed as a moving image in an almost real-time manner or as successive images on the LCD 16. In other words, the LCD 16 can be used as an electronic viewfinder. The user can recognize the angle of view not only by a normal optical finder but also by an image displayed on the LCD 16 (so-called through image). In response to a predetermined recording direction (shooting direction) operation such as depression of a shutter switch, shooting of digital image data to be recorded starts.

At the time of reproducing an image, compression data to be reproduced, which is stored in a recording medium is read by the medium control unit 48 and decompressed by the JPEG circuit 36. After that, the decompressed data is transferred to the LCD signal processing unit 46. By the operations, an image based on the compressed data obtained by the shooting operation and stored in the recording medium can be reproduced and displayed on the LCD 16.

The digital camera 10 can compress a still image by the JPEG system and record the compressed image onto a recording medium in the still image shooting mode, and can also record a moving image onto a recording medium in the moving image shooting mode.

A moving image is recorded in a relatively small size such as the QVGA size (320×240 pixels) or VGA size (640×480 pixels). A still image can be recorded not only in the QVGA or VGA size but also in a large size such as the SVGA size (800×600 pixels), XGA size (1024×768 pixels) or SXGA size (1280×1024 pixels).

In the embodiment, in the moving image shooting mode, a moving image is compressed and encrypted by the so-called motion JPEG system. According to the motion JPEG system, a shot image is compressed by the JPEG system every predetermined time and the compressed image is recorded. By reproducing a plurality of still images successively, moving image display is realized. In the motion JPEG system, digitalization of a video image is easier as compared with a coding system having a high-degree compression algorithm such as the MPEG (Moving Picture coding Experts Group). The motion JPEG system is characterized in that a process on an image frame unit basis can be performed easily by an editing work or the like.

The image process on each frame in the moving image shooting mode is similar to that in the still image shooting mode. Moving image data is generated on the basis of image data of a plurality of still images according to shooting time and is recorded on a recording medium.

The digital camera 10 can also shoot a still image by depressing the shutter button during the moving image shooting in the moving image shooting mode. The frame rate in the moving image process is, for example, about 30 fps (frames/ sec). Hitherto, the still image process cannot be performed without stopping the moving image process once.

In the embodiment, as will be described in detail later, the JPEG circuit 36 is provided with a dedicated buffer for temporarily storing a still image in the case of performing the still image shooting during the moving image shooting, and a dedicated region for temporarily storing a still image is provided in the SDRAM 20. With the configuration, even in the case of performing the still image shooting during the moving image shooting, the still image process can be performed without stopping the moving image process.

Figure 2:
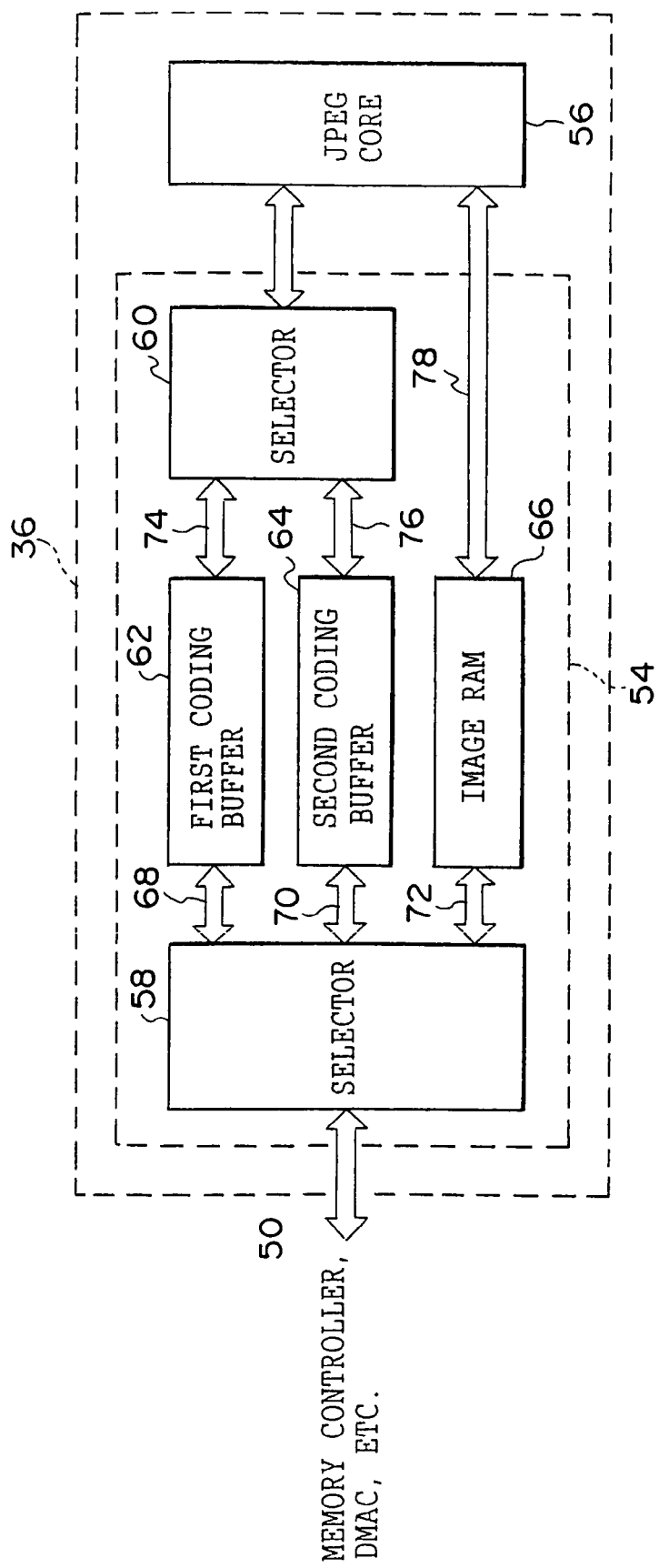
FIG. 2 is a block diagram of a JPEG circuit according to a first embodiment of the invention.

FIG. 2 is a schematic block diagram of the JPEG circuit 36. The JPEG circuit 36 is constructed by, as shown in FIG. 2, a JPEG module 54 and a JPEG core 56.

The JPEG module 54 includes selectors 58 and 60, the first coding buffer 62, a second coding buffer 64 and an image RAM 66.

The selector 58 is connected to the memory controller 38 and the DMAC 42 via the bus 50, and is connected to the first coding buffer 62, second coding buffer 64, and image RAM 66 via buses 68, 70 and 72, respectively.

The first coding buffer 62 and the second coding buffer 64 are connected to the selector 60 via buses 74 and 76, respectively, and the image RAM 66 is connected to the JPEG core 56 via a bus 78.

The JPEG core 56 performs a compressing process, for example, in the unit of a block consisting of 8×8 pixels (=64 pixels), so that each of the first coding buffer 62, second coding buffer 64, and image RAM 66 has a memory of capacity according to the process unit of the JPEG core 56. For example, each of the first and second coding buffers 62 and 64 is a memory having capacity of one block, and the image RAM 66 is a memory of eight blocks.

The selector 58 selects any one of the buses 68, 70, and 72 in accordance with the direction of the CPU 32. The selector 60 selects either the bus 74 or 76 in accordance with the direction of the CPU 32.

The YC data temporarily stored in the SDRAM 20 is DMA transferred from the SDRAM 20 to the JPEG circuit 36 via the memory controller 38 by the control of the DMAC 42. At this time, the CPU 32 gives a direction to select the bus 72 so that the selector 58 is connected to the image RAM 66. The YC data that is DMA transferred is temporarily stored into the image RAM 66. The YC data stored in the image RAM 66 is input to the JPEG core 56 and subjected to the compressing process block by block.

The compressed data is temporarily stored into the first coding buffer 62 or second coding buffer 64 via the selector 60. Compressed data of a still image in the still image shooting mode or compressed data of a moving image in the moving image shooting mode is stored in the first coding buffer 62. On the other hand, compressed data of a still image obtained when the still image shooting is performed during the moving image shooting in the moving image shooting mode is temporarily stored in the second coding buffer 64. In short, the selector 60 selects the bus 74 in the case of performing the process of compressing a still image in the still image shooting mode or the case of performing the process of compressing a moving image in the moving image shooting mode, and selects the bus 76 in the case of performing the process of compressing a still image obtained when the still image shooting is performed during the moving image shooting in the moving image shooting mode.

Similarly, the selector 58 selects the bus 68 in the case of performing the process of compressing a still image in the still image shooting mode or the case of performing the process of compressing a moving image in the moving image shooting mode, and selects the bus 70 in the case of performing the process of compressing a still image obtained when the still image shooting is performed during the moving image shooting in the moving image shooting mode.

Compressed data temporarily stored in the first coding buffer 62 or second coding buffer 64 is DMA transferred to the predetermined region in the SDRAM 20 via the memory controller 38 by the control of the DMAC 42.

As described above, the second coding buffer 64 functioning as a buffer dedicated to still images in the case of performing the still image shooting during the moving image shooting is provided. Consequently, without stopping the moving image process during the moving image shooting, the still image process can be performed.

Figure 3:
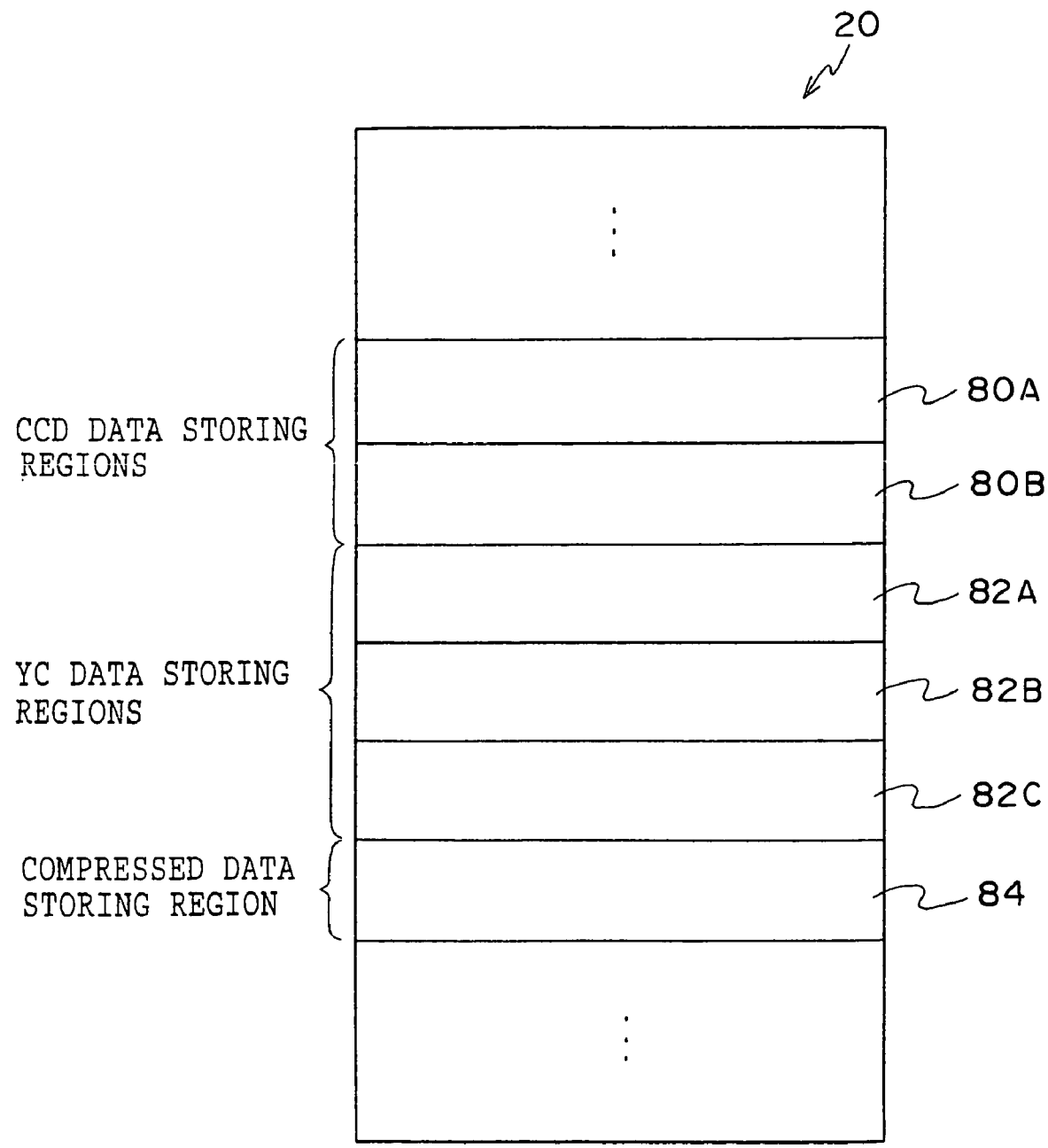
FIG. 3 is a view showing a memory map of an SDRAM.

FIG. 3 schematically shows a memory map of the data storing region in the SDRAM 20. As shown in FIG. 3, the SDRAM 20 includes CCD data storing regions 80A and 80B for storing CCD data, YC data storing regions 82A, 82B and 82C for storing YC data, and a compressed data storing region 84 for storing compressed data. Each of the regions has capacity sufficient to store image data of one screen.

During the moving image shooting, the CCD data storing region 80A and the YC data storing region 82A are used for odd-numbered frame images from the start of image shooting. The CCD data storing region 80B and the YC data storing region 82B are used for even-numbered frame images from the start of image shooting. The YC data storing region 82C is a region for storing YC data in the case where the still image shooting is performed during the moving image shooting.

FIGS. 4A to 4D show timing charts of timings of CCD data writing, the moving image process and the like in the moving image shooting mode.

Figure 4:
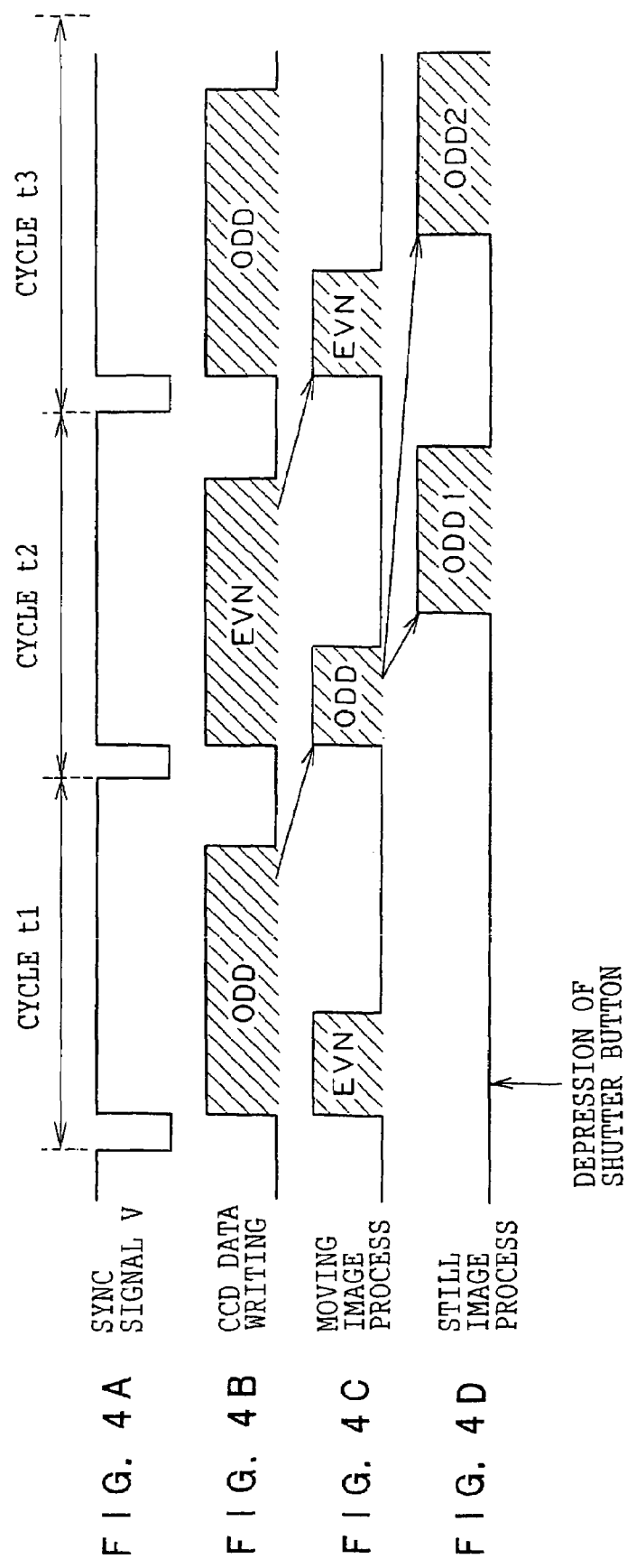
FIGS. 4A to 4D are timing charts showing timings of a sync signal, writing of CCD data, a moving image process, and a still image process, respectively.

In the moving image shooting mode, a moving image process or the like is performed on each frame image in accordance with a sync signal V as shown in FIG. 4A. The sync signal V is a signal based on a predetermined frame rate. For example, when the frame rate is set to 30 fps, the sync signal V is a signal of which level becomes low every 1/30 second. Therefore, in this case, 1/30 second is used as one cycle, and the process on each frame has to be performed during the cycle.

When the level of the sync signal V becomes low, as shown in FIG. 4B, taking CCD data in starts. The CCD data of an odd-numbered frame image is written into the CCD data storing region 80A, and the CCD data of an even-numbered frame image is written into the CCD data storing region 80B. The CCD data in the frame images is alternately written into the CCD data storing regions 80A and 80B. In FIGS. 4A to 4D, a period of performing the process on an odd-numbered frame image is indicated as "ODD", and a period of performing the process on an even-numbered frame image is indicated as "EVN".

As shown in FIG. 4C, in parallel with writing of the CCD data, the moving image process is performed. In the moving image process, CCD data of a frame image of an immediately preceding cycle is read from the CCD data storing region, a resizing process, various image processes and YC converting process are performed on the read CCD data, and YC data is temporarily stored into the YC data storing region. The YC data stored in the YC data storing region is read and subjected to a compressing process. In the compressing process, as described above, the YC data is sequentially transferred to the image RAM in the JPEG circuit 36 and compressed by the JPEG core 56. The compressed data is then temporarily stored into the first coding buffer 62 and, after that, transferred to the compressed data storing region 84. The compressed data stored in the compressed data storing region 84 is sequentially recorded onto a recording medium.

As shown in FIGS. 4A to 4D, for example, in the cycle t2, a process of writing CCD data in an even-numbered frame image into the CCD data storing region 80B is performed. CCD data written in the CCD data storing region 80A in the immediately preceding cycle t1 is read from the CCD data storing region 80A and is subjected to the moving image process. The reason why the period of the moving image process is shorter than the period of the CCD data writing is that clocks of data transfer are faster than clocks of the CCD 13 by a few times, and time required for data transfer is shortened.

As described above, by providing two CCD data storing regions and two YC data storing regions, the CCD data writing process and the moving image process can be performed concurrently. It is also possible to provide three or more CCD data storing regions and three or more YC data storing regions.

In the moving image shooting, for example, as shown in FIG. 4D, when the shutter button is depressed in the cycle t1 to direct the still image shooting, in the following cycle t2, the still image process is performed. Specifically, in the cycle t1, CCD data stored in the CCD data storing region 80A is read, the read CCD data is subjected to the resizing process, various image processes and YC converting process, and YC data is temporarily stored into the YC data storing region 82C. After that, the YC data stored in the YC data storing region 82C is read and compressed. In the compressing process, as described above, the YC data is subsequently transferred to the image RAM 66 in the JPEG circuit 36 and compressed by the JPEG core 56. The compressed data is temporarily stored in the second coding buffer 64 and, after that, transferred to the compressed data storing region 84. The compressed data stored in the compressed data storing region 84 is sequentially recorded onto a recording medium.

When size larger than the recording size of a moving image is set as the recording size of a still image, a case such that the process cannot be completed in one cycle may occur. Consequently, in the embodiment, the YC data storing region 82C dedicated to store YC data when the still image shooting is performed in the moving image shooting is provided. The JPEG circuit 36 is provided with the second coding buffer 64 for storing compressed data of a still image shot by the still image shooting performed during the moving image shooting.

With the configuration, even in the case where the still image shooting is performed during the moving image shooting, it is unnecessary to finish the still image process in the one cycle. The still image process can be divided and executed in periods other than the period of the moving image process of each cycle.

To be specific, as shown in FIG. 4D, the remaining still image process, which is not finished in the cycle t2, can be executed in the following cycle t3. In FIG. 4D, the periods in which the divided still image processes are executed are indicated by "ODD1" and "ODD2".

Since the still image process can be divided and executed, it is unnecessary to stop the moving image process once in order to perform the still image process.

As actions of the embodiment, the flow of the moving image shooting process executed by the digital camera 10 will now be described with reference to the flowcharts of FIGS. 5 and 6.

Figure 5:
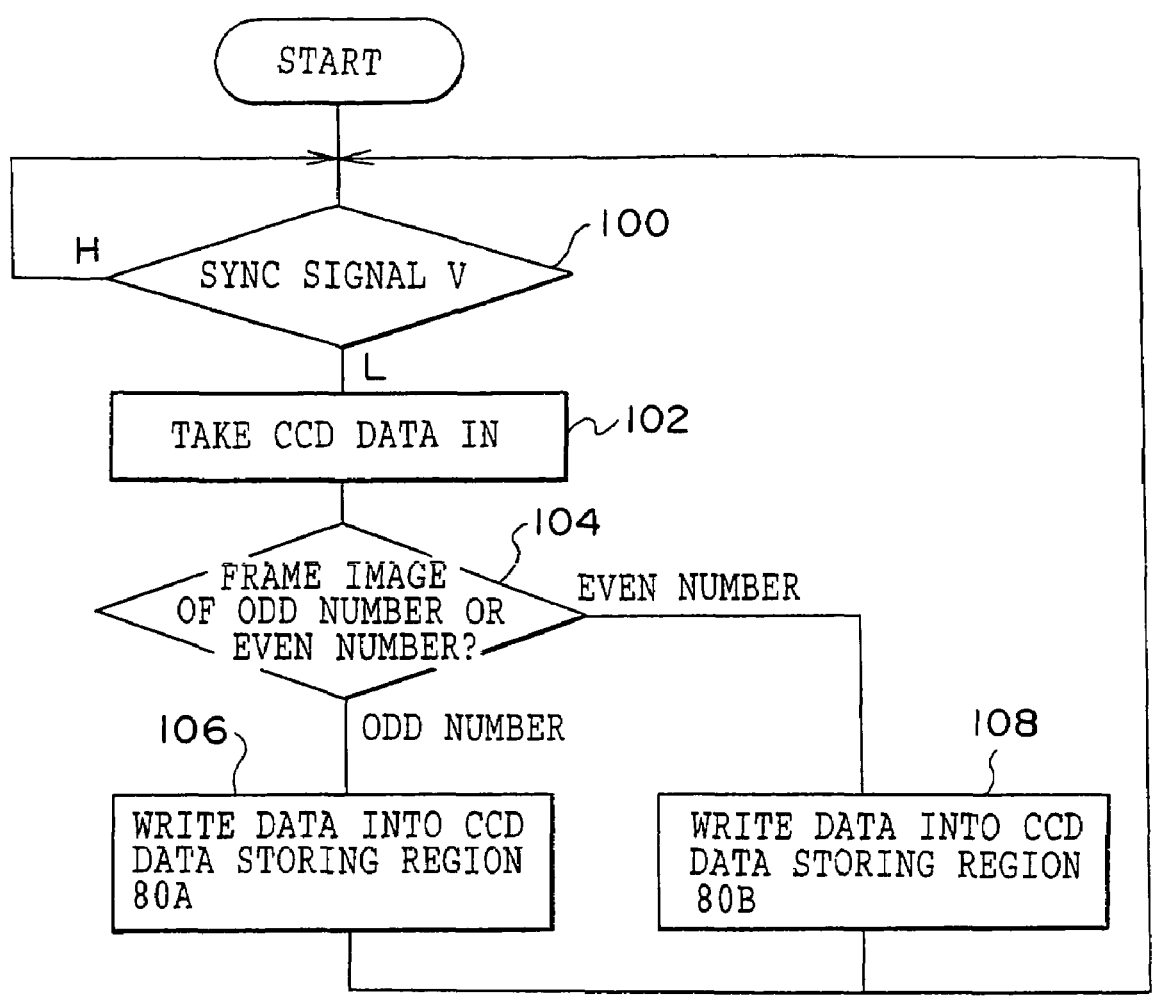
FIG. 5 is a flowchart of a CCD data writing process.
Figure 6:
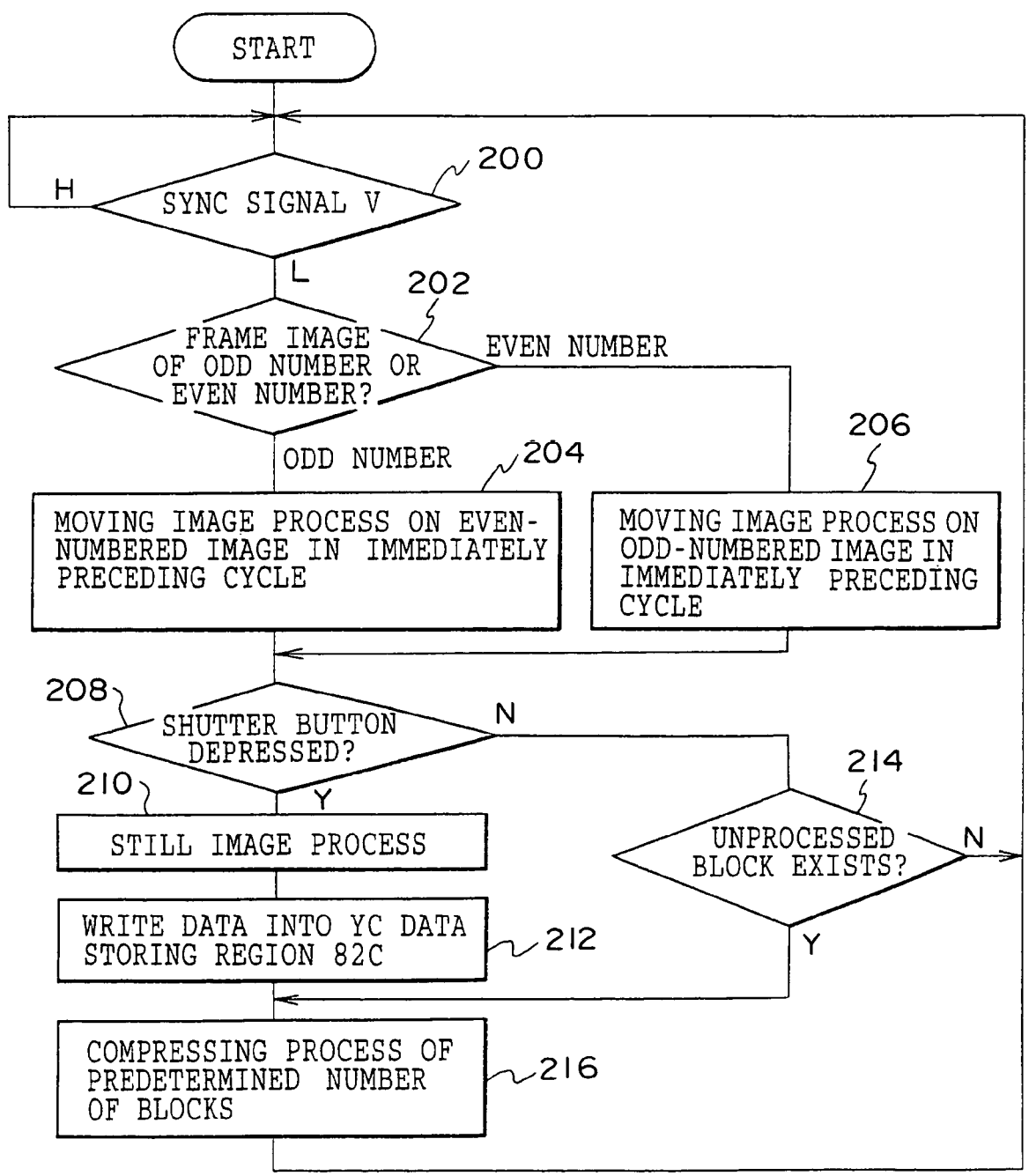
FIG. 6 is a flowchart of a moving image process and a still image process.

The process routines shown in FIGS. 5 and 6 are executed when the shutter button is depressed in the moving image shooting mode. FIG. 5 shows the process routine of CCD data writing, and FIG. 6 shows the process routine of the moving image process and the still image process.

First, the process routine of CCD data writing of FIG. 5 will be described. In step 100, whether the sync signal V is at the low level or high level is determined. When the sync signal V is at the low level, the process continues to step 102. When the sync signal V is at the high level, the process waits until the level of the sync signal V becomes low.

In step 102, taking CCD data in is started. In step 104, whether a shot frame image is odd-numbered or even-numbered is determined. In the case where the shot frame image is odd-numbered, the process continues to step 106. In the case where the shot frame image is even-numbered, the process continues to step 108.

In step 106, CCD data sequentially taken in is written into the CCD data storing region 80A by the DMA transfer. On the other hand, in step 108, the sequentially taken in CCD data is written into the CCD data storing region 80B by the DMA transfer. Such a process is executed each time the level of the sync signal V becomes low.

In parallel with the process routine of FIG. 5, the process routine shown in FIG. 6 is executed. In step 200 shown in FIG. 6, whether the sync signal V is at the low level or high level is determined. In the case where the sync signal V is at the low level, the process continues to step 202. In the case where the sync signal V is at the high level, the process waits until the level of the sync signal V becomes low.

In step 202, whether the shot frame image is odd-numbered or even-numbered is determined. In the case where the shot frame image is odd-numbered, the process continues to step 204. In the case where the shot frame image is even-numbered, the process continues to step 206.

In step 204, the moving image process is performed on CCD data stored in the CCD data storing region 80B in the immediately preceding cycle. Specifically, CCD data stored in the CCD data storing region 80B is read by the DMA transfer and subjected to the above-described resizing process and various image processes, thereby generating YC data. The YC data is DMA transferred to the YC data storing region 82B in the SDRAM 20. The YC data is transferred from the YC data storing region 82B by the DMA transfer to the JPEG circuit 36 and is compressed. The compressed data is temporarily stored in the first coding buffer 62 and sequentially stored into the compressed data storing region 84. The process in step 204 is executed in parallel with that of step 106 in FIG. 5.

In step 206, the moving image process is performed on the CCD data stored in the CCD data storing region 80A in the immediately preceding cycle. Specifically, CCD data stored in the CCD data storing region 80A is read by the DMA transfer and subjected to the above-described resizing process and various image processes, thereby generating YC data. The YC data is DMA transferred to the YC data storing region 82A in the SDRAM 20. The YC data is then transferred by the DMA transfer from the YC data storing region 82A to the JPEG circuit 36 and compressed. The compressed data is temporarily stored into the first coding buffer 62 and sequentially stored into the compressed data storing region 84. The process in step 206 is executed in parallel with step 108 in FIG. 5.

Therefore, in parallel with writing of CCD data of an odd-numbered image into the SDRAM 20, the moving image process on an even-numbered image in the immediately preceding cycle is executed. In parallel with writing of CCD data of an even-numbered image into the SDRAM 20, the moving image process on an odd-numbered image in the immediately preceding cycle is performed.

In step 208, whether the shutter button is depressed or not is determined. When the determination is affirmative, the process continues to step 210. When the determination is negative, the process continues to step 214.

In step 210, the still image process is performed. Specifically, CCD data stored in the CCD data storing region in which CCD data is not being written, that is, CCD data written in the immediately preceding cycle is read by the DMA transfer and is subjected to the resizing process for still image and the various image processes as described above.

In step 212, the generated YC data is DMA transferred to the YC data storing region 82C in the SDRAM 20.

In step 216, YC data of a predetermined number of blocks is transferred from the YC data storing region 82C to the JPEG circuit 36 by the DMA transfer and compressed. The number of blocks of YC data to be compressed may be preliminarily determined, for example, on the basis of the relations of time required for the moving image process executed first, time of one cycle, and time required for the process of compressing one block, or the number of blocks which can be processed may be obtained by measuring time required for the moving image process, remaining time, and time required for the process of compressing one block. The compressed data is temporarily stored into the first coding buffer 62 and is sequentially stored into the compressed data storing region 84.

On the other hand, in the case where it is determined that the shutter button is not depressed in step 208, in step 214, whether an unprocessed block exists or not is determined. In the case where unprocessed block exists, the compressing process of the predetermined number of blocks is performed in step 216 in a manner similar to the above. In the case where unprocessed block does not exist, the process returns to step 200.

As described above, when the still image shooting is directed during the moving image shooting, YC data subjected to the still image process is stored into the YC data storing region 82C as the dedicated storing region. Consequently, it is unnecessary to finish the compressing process within one cycle. The still image compressing process can be divided into processes for a plurality of cycles and each of the processes can be performed in the period other than the moving image process in each cycle. Therefore, without stopping the sequence of the moving image process, the still image process can be performed.

In the embodiment, when the still image shooting is directed in the moving image shooting, YC data is directly stored in the YC data storing region 82C. The invention, however, is not limited to the case. It is also possible to store the YC data into the YC data storing region 82B and immediately transferred to the YC data storing region 82C.

SECOND EMBODIMENT

A second embodiment of the invention will now be described. The like reference numerals are given to the like components as those in the first embodiment and their detailed description will be omitted.

Figure 7:
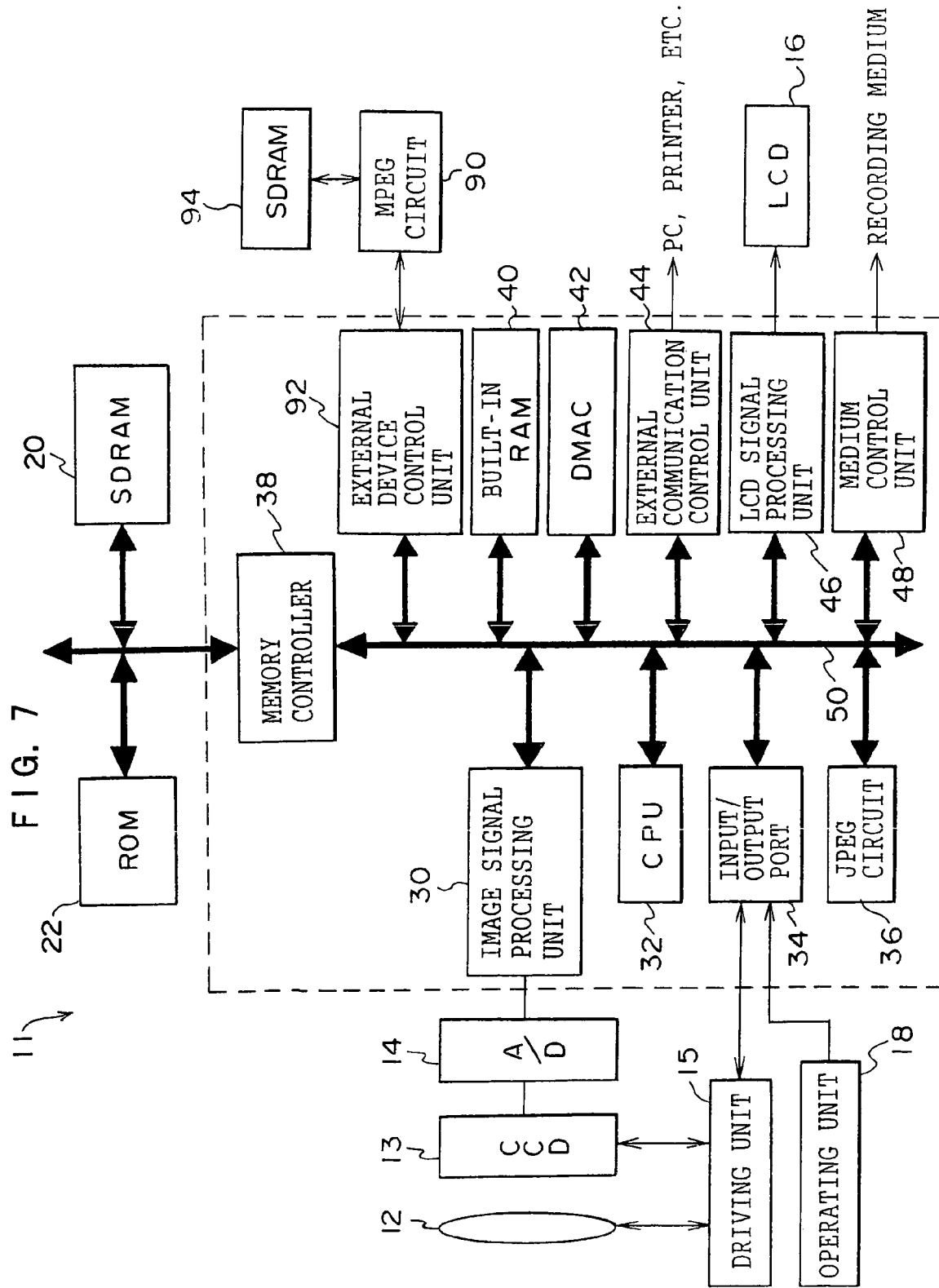
FIG. 7 is a block diagram of a digital camera according to a second embodiment of the invention.

FIG. 7 is a block diagram of a digital camera 11 according to the second embodiment. Different from the digital camera 10 in the first embodiment, the digital camera 11 has an MPEG circuit 90 dedicated to a moving image process.

To the MPEG (Moving Image coding Experts Group) circuit 90, an external device control unit 92 connected to the bus 50 of the main control unit 24 and an SDRAM 94 for temporarily storing processed moving image data are connected.

In the moving image shooting mode, YC data generated for a moving image is input to the MPEG circuit 90 via the external device control unit 92 and then compressed and encrypted. Therefore, the JPEG circuit 36 is dedicated to the still image process.

As described above, by providing an MPEG circuit dedicated to the moving image process, even in the case where still image shooting is directed in the moving image shooting, without stopping the sequence of the moving image process, the still image process can be performed in parallel with the moving image process. Thus, the process can be performed at higher speed.

In the embodiment, the circuit for performing the moving image process and the circuit for performing the still image process are separated from each other. Consequently, it is unnecessary to provide two coding buffers as in the JPEG circuit 36 described in the first embodiment. A normal JPEG circuit having only one coding buffer may be used.

What is claimed is:

1. An image recording apparatus comprising:
a shooting component which shoots an image of a subject;
a first storing component which stores shot frame image data;
a moving image compressing component which generates moving image data by performing a compressing process for a moving image on the frame image data;
a moving image data recording component which records the moving image data onto a recording medium;
a second storing component which stores the frame image data in a case where still image shooting is directed during the moving image shooting;
a still image compressing component which generates still image data by performing a compressing process for a still image on the frame image data stored in the second storing component;
a control component which controls the still image compressing component so as to divide the compressing process for the still image into processes for a plurality of predetermined periods and execute the divided compressing processes for the still image, when the compressing process for the still image is not finished within one predetermined period; and
a still image data recording component which records the still image data onto a recording medium,
wherein the image recording apparatus is characterized by shooting still images during shooting of moving images, wherein a moving image process on a frame image to generate said moving image data is performed in said one predetermined period at a different time from a time when a compressing process for the still image is performed in said one predetermined period.

2. The image recording apparatus of claim 1, wherein the moving image compressing component also serves as the still image compressing component and the still image data is generated in a period other than the period of performing the process of generating the moving image data.

3. The image recording apparatus of claim 1, wherein when the still image shooting is directed during the moving image shooting, the control component copies frame image data stored in the first storing component to the second storing component.

4. An image compressing apparatus comprising:
a compressing process component which performs a compressing process on input frame image data;
a first buffer which stores compression data for a moving image subjected to the compressing process;
a second buffer which stores compression data for a still image subjected to the compressing process; and a control component which controls the compressing process component so as to divide the compressing process for the still image into processes for a plurality of predetermined periods and execute the divided compressing processes for the still image, when the compressing process for the still image is not finished within a predetermined period, wherein the image compressing apparatus is characterized by shooting still images during shooting of moving images, wherein a compressing process for the still image is performed during at least one predetermined period, and a compressing process for the moving image is performed in said at least one predetermined period at a different time from a time when a compressing process for the still image is performed in said one predetermined period.

5. An image recording method in an image recording, the image recording method comprising:

shooting an image of a subject;

storing shot frame image data into a first storing component;

generating moving image data by performing a compressing process for a moving image on the frame image data;

recording the moving image data onto a recording medium;

in a case where the still image shooting is directed during moving image shooting, storing the frame image data into a second storing component;

generating still image data by performing a compressing process for the still image on the frame image data stored in the second storing component; and recording the still image data onto a recording medium, wherein when the compressing process for still image is not finished within one predetermined period, the compressing process for the still image is divided into processes for a plurality of predetermined periods and executed, and the image recording method still images during shooting of moving images, wherein a moving image process on a frame image to generate said moving image data is performed in said one predetermined period at a different time from a time when a compressing process for the still image is performed in said one predetermined period.

6. The image recording method of claim 5, wherein a still image data is generated in a period other than the period of performing the process of generating the moving image data.

7. The image recording method of claim 5, wherein when the still image shooting is directed during the moving image shooting, frame image data stored in the first storing component is copied into the second storing component.

* * * * *